(12) United States Patent
McRae

(10) Patent No.: US 9,860,217 B2
(45) Date of Patent: Jan. 2, 2018

(54) ENCRYPTED STREAMS TO RECEIVERS

(71) Applicant: Vizio Inc, Irvine, CA (US)

(72) Inventor: Matthew Blake McRae, Irvine, CA (US)

(73) Assignee: Vizio Inc, Irvine, CA (US)

( * ) Notice: Subject to any disclaimer, the term of this patent is extended or adjusted under 35 U.S.C. 154(b) by 189 days.

(21) Appl. No.: 14/481,355

(22) Filed: Sep. 9, 2014

(65) Prior Publication Data
US 2016/0072774 A1    Mar. 10, 2016

(51) Int. Cl.
*H04L 29/06*    (2006.01)
*H04L 9/14*    (2006.01)
*G06F 21/30*    (2013.01)

(52) U.S. Cl.
CPC ............ *H04L 63/0428* (2013.01); *H04L 9/14* (2013.01); *H04L 69/24* (2013.01); *G06F 21/30* (2013.01); *H04L 2209/603* (2013.01)

(58) Field of Classification Search
CPC ............ H04L 63/0428; H04L 2209/24; H04L 63/061; H04L 69/24; H04L 9/14; H04L 2209/603; G06F 3/04842; G06F 21/30
See application file for complete search history.

(56) References Cited

U.S. PATENT DOCUMENTS

| 6,016,348 A * | 1/2000 | Blatter ................. H04N 5/4401 348/E5.004 |
| 2013/0198521 A1* | 8/2013 | Wu ..................... G06F 21/6209 713/175 |
| 2014/0344575 A1* | 11/2014 | Saremi ................ H04L 63/0428 713/168 |
| 2015/0082038 A1* | 3/2015 | Sato .................... H04L 63/0869 713/169 |

* cited by examiner

*Primary Examiner* — Edward Zee
*Assistant Examiner* — Chi Nguy
(74) *Attorney, Agent, or Firm* — Law Office of Scott C Harris, Inc.

(57) ABSTRACT

Techniques to ensure that a content stream will be encrypted prior to it being served it to the stream receiver if either the stream receiver returned an initial status to the stream caster indicating that only encrypted streams will be accepted or if the user of the stream caster optioned that only encrypted streams will be cast. A stream casting device is capable of locally sourcing and encrypting streams. A content stream server is capable of sourcing encrypted streams and encrypting streams on the fly. A stream receiver device is also described. The system manages key exchanges, encryption, and decryption across the devices serving streams, and stream receiving devices. The casted streams, residing on either a content stream server or on the stream casting devices will be encrypted prior to being served.

20 Claims, 4 Drawing Sheets

ENCRYPTED STREAMS TO RECEIVERS

BACKGROUND

Casting video/audio content is a relative new initiative where content can be discovered on devices such as desktop and laptop computers, tablet computers, smart cellular phones, PDAs, gaming consoles, and other devices capable of finding content residing on networks or local storage. Once content has been located, it can be played on the device that found it or it can be redirected or "cast" to a "second screen". The second screens are typically televisions, monitors, projectors, augmented reality devices, or virtual reality devices. The casting device locates receiving devices (stream receivers) with access to the second screen or receiving devices embedded into or are part of the second screen. The casting device can, once a stream receiver device is discovered, redirect the content stream to the stream receiver which displays the content on the second screen.

Currently few if any casting agents can provide content encryption notifications to stream receivers for the stream or content to be casted. This is often not a large concern for home environments but can present a significant issue with business environments. In the business environment, data being cast to a display device can contain sensitive business information that would be relatively easy to compromise between the content server and the stream receiver.

SUMMARY

The inventor recognized that it would be useful to provide a technique that would give a user of stream casting devices the ability to have content being streamed to second screens to be encrypted. Ideally, the encryption would occur "on the fly" such that the stream would be encrypted prior to being transmitted and decrypted just after being received and just prior to being displayed.

Embodiments described herein enable stream casting and stream receivers and source content devices to encrypt stream content and static content on the fly or to stream pre-encrypted content using DRM protected content by performing key exchanges prior to the content being streamed. Stream casters are able to setup peer to peer (content servers providing streaming content to receivers) and static stream casters and stream receivers with encrypted content which is particularly useful in business environments.

BRIEF DESCRIPTION OF THE DRAWINGS in the drawings.

DETAILED DESCRIPTION

In a preferred embodiment, a stream caster has the ability to notify the stream receiver that the user desires the content stream to be encrypted. The streams in this embodiment are residing on a computer storage device in the clear and not encrypted. The stream caster in this embodiment sends the user's requirement for encryption as a notification along with a URL pointing to the content to be streamed that is resident on a server to the stream receiver. The stream receiver uses the URL to contact the stream content server and notify it that the content stream shall be encrypted. The stream receiver and the content stream server then perform a key exchange. Once the stream receiver notifies the content stream provider that it is ready to receive the stream, the stream provider begins encrypting the content before it streams the content to the stream receiver. The stream receiver receives the encrypted content stream, decrypts the encrypted content stream and sends the clear text content stream to the display device.

In a related embodiment, the content residing on the content stream provider is pre-encrypted. The stream receiver is notified by the content stream provider that the content stream is encrypted and a key exchange is needed. The stream receiver performs a key exchange by sending the stream content provider its public key which the stream content provider uses to encrypt the session key for the selected content file. The encrypted session key is sent to the stream receiver which uses the session key to decrypt the stream that is subsequently sent to the stream receiver by the content stream provider.

In another embodiment, the stream to be cast will have already been encrypted by the stream content owner. In this embodiment, the stream content server notifies the stream receiver that the selected content stream is protected by DRM from the content owner. In this embodiment, the stream receiver then contacts the content stream server and performs a key exchange prior to the content stream server starting the content stream. This type of content may also use keys that are changed periodically based on time or numbers of frames or other parameters.

DETAILED DESCRIPTION OF THE EMBODIMENTS

Figure 1:
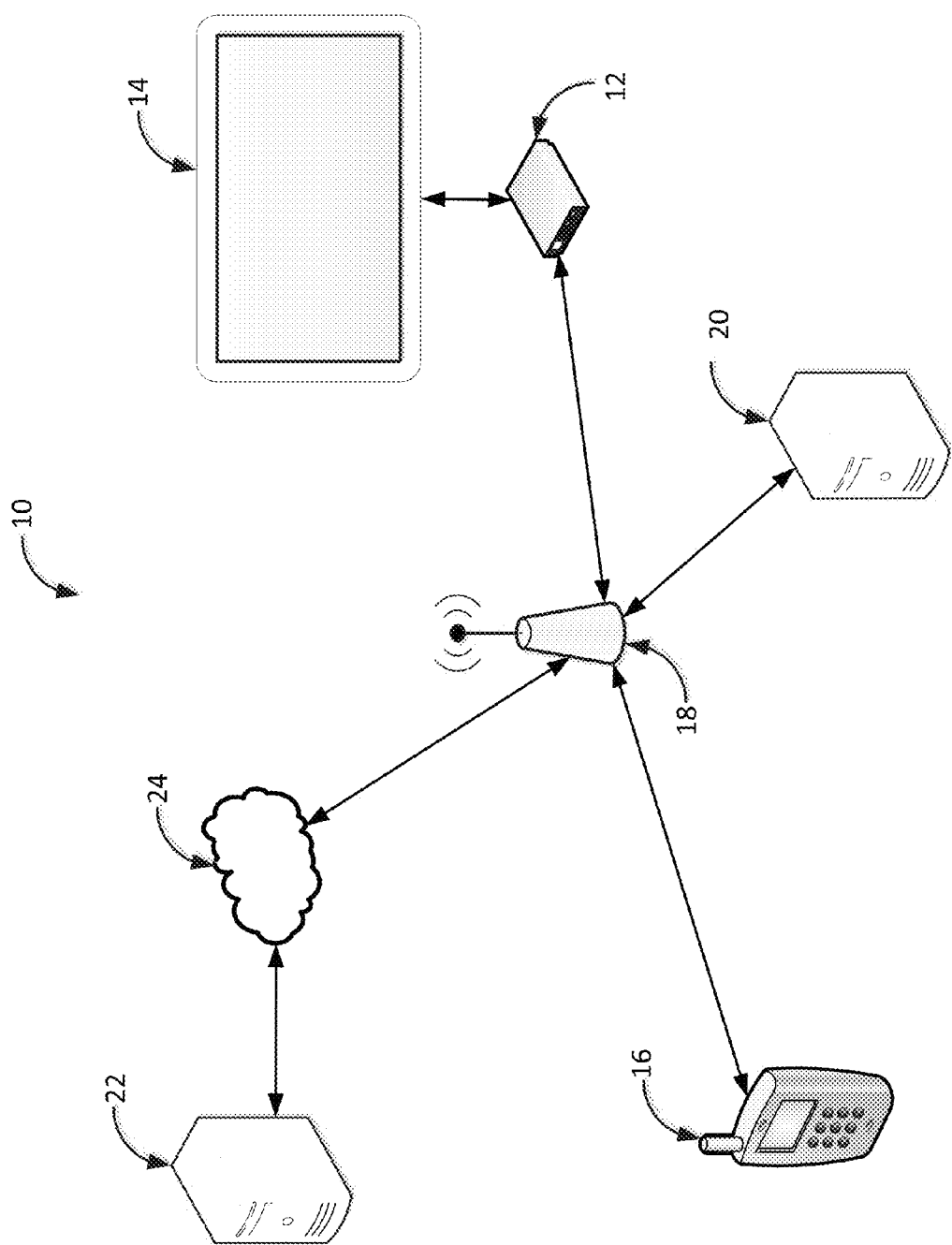
FIG. 1 is a schematic showing a smart phone as the stream caster, two source content servers with one local to the Wifi Access Point (AP) and one residing on the internet, and stream receiver connect to a television as the second screen.

Now referencing FIG. 1 where 10 depicts an embodiment of the invention where the stream caster is an application executing on smart phone 16 and stream receiver 12 which is connected to television 14. In this embodiment there are two stream content servers 20 and 22. Content server 20 resides on the local area network and content server 22 resides on the internet. Wifi Access Point (AP) 18 provides the connecting element between the stream caster running on smart phone 16, stream receiver 12 and both stream content servers. More generally, however, the stream caster and stream receiver can be incorporated together into a single device which both receives content streams and carries out the other functions.

In this depiction, stream caster 16 first accesses local content server 20 or remote content server 22 and requests a list of available content. The content server (20 or 22) sends a list of available content to stream caster 16. Stream caster 16 displays the list of available content to the user who selects one of the available content streams for casting.

Stream caster 16 then sends the URL for the selected content to stream receiver 12. Stream caster 16 then asks the user if the content should be encrypted. If the user responds with "YES", stream caster 16 will then notify stream receiver 12 that the content is to be encrypted prior to streaming.

After being notified that the content stream is to be encrypted, stream receiver 12 sends its public key to content server 20 or 22 and requests a session key be returned. Content server 20 or 22 receives a public key from stream receiver 12 then creates a session key, encrypts the session key with the public key received from stream receiver 12. Content server 20 or 22 then sends the encrypted session key to stream receiver 12.

Stream receiver 12 then decrypts and saves the session key received from content server 20 or 22 then notifies content server 20 or 22 to start encrypting and streaming the selected content. Content server 20 or 22 then begins encrypting and streaming the content to stream receiver 12 which begin decrypting and transferring the content stream to television 14.

Figure 2:
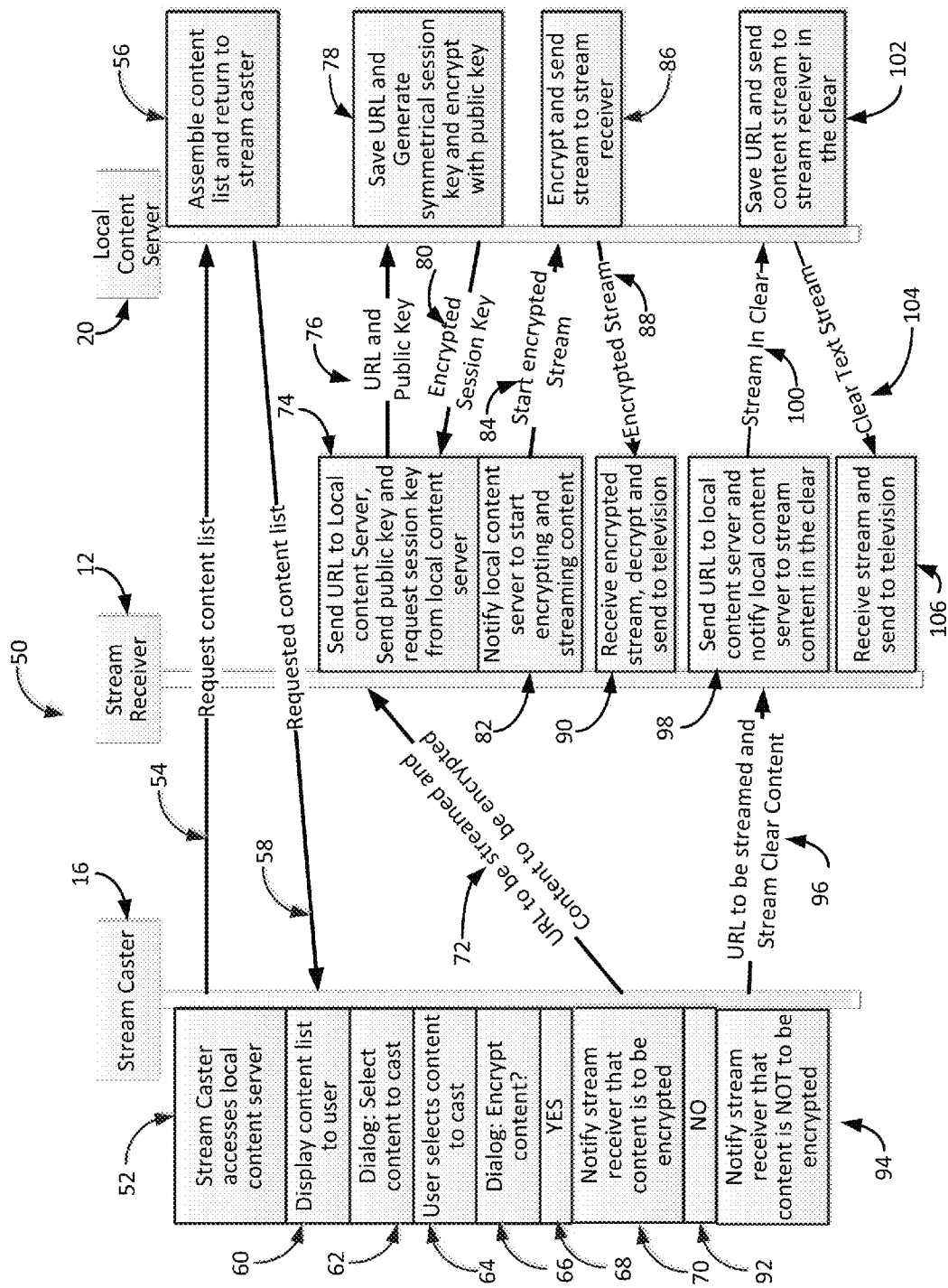
FIG. 2 is a schematic depicting the logic flow for the case where the user indicates, through the stream caster to the stream receiver, that the content to be cast needs to be encrypted on the fly before the content server sends the stream to the stream receiver.

Now referencing FIG. 2 where 50 depicts the detailed logic flow for how the stream caster allows the user to decide if an unencrypted stream to be casted should be encrypted. In this depiction, stream caster 16 at processing block 52 "stream caster accesses local content server" makes a request to local content server 20 by sending signal 54 "request content list" to processing block 56 "assemble content list and return to stream caster". This processing block assembles a list of available content residing on local content server 20 and sends the list as signal 58, "requested content list" to display processing block 60 "display content list to user".

This processing block the list of available content to the user, after which control falls through to dialog processing block 62 "dialog: select content to cast". This processing block 62 asks the user to select content from the displayed list, after which control falls through to user select processing block 64 "user selects content to cast" after which control falls through to dialog processing block 66 "dialog: encrypt content?". This processing block queries the user to determine if the user wants the selected content stream to be encrypted prior to being streamed. If the user replies "YES", control falls through to results processing block 68 YES after which control falls through to notify processing block 70 "notify stream receiver that content is to be encrypted".

This processing block sends signal 72 "URL to be streamed and content to be encrypted". This signal contains the URL pointing to the content that will be streamed along with a notification that the content must be encrypted. This signal is sent to send URL processing block 74 "send URL to local content server, send public key and request session key from local content server". This processing block packages up the URL and a public key together in signal 76 "URL and public key" which is sent to save URL processing block 78 "save URL and generate symmetrical session key and encrypt with public key" that resides on local content server 20.

This processing block will save the URL for the content file to be streamed and will generate a session key that will be used to both encrypt and decrypt the encrypted content stream. After the session key has been generated and encrypted by the received public, processing block 78 will send the encrypted session key as signal 80 "encrypted session key" back to processing block 74 after which control will fall through to notify processing block 82 "notify local content server to start encrypting and streaming content".

This processing block will send signal 84 "start encrypted stream" to encrypt processing block 86 "encrypt and send stream to stream receiver" residing on local content server 20.

This processing block will read content from the content file identified by the URL, encrypted the content and will send it as signal 88 "encrypted stream" to receive processing block 90 "receive encrypted stream, decrypt and send to television" residing on stream receiver 12.

This processing block will receive the encrypted content stream from local content server 20, decrypt the stream using the session key and will send the content in the clear to the television.

If the user had responded to dialog processing block 66 "dialog: encrypt content?" with a response of NO, control would have been transferred to response processing block 92 NO after which control would have fallen through to notify processing block 94 "notify stream receiver that content is not to be encrypted".

This processing block will send signal 96 "URL to be streamed and stream clear content" to send processing block 98 "send URL to local content server and notify local content server to stream content in the clear". This processing block will send signal 100 "stream in clear" to save processing block 102 "save URL and send content stream to stream receiver in the clear".

This processing block will read the content stream pointed to be the URL and send the content stream as signal 104 "clear text stream" to receive processing block 106 "receive stream and send to television". This processing block receives the unencrypted content stream and sends it to the television.

Figure 3:
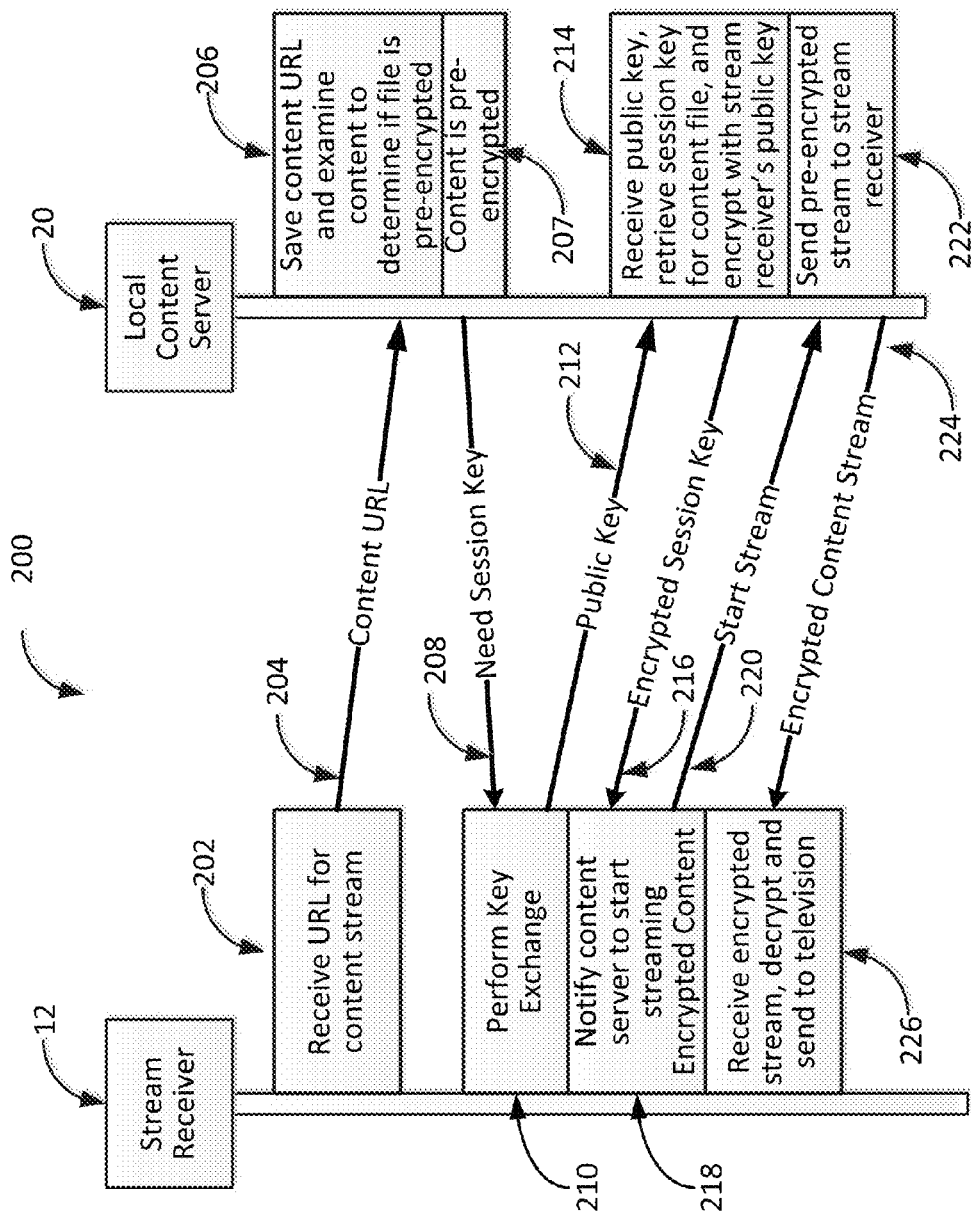
FIG. 3 is a schematic depicting the logic flow for the case where content residing on the content server is already encrypted.

Now referencing FIG. 3 where 200 depicts the case where the steaming content on local content server 20 has been pre-encrypted on the content server. Note that this (and the FIG. 4 embodiment), uses pre-encrypted content along with non-encrypted content. The non-encrypted content is handled as described above as in FIG. 2; the pre-encrypted content is handled as described in these embodiments depicted in FIGS. 3 and 4. This depiction starts at processing block 202 "Receive URL for content stream" from stream caster 16. This processing block sends signal 204 "Content URL" to processing block 206 "save content URL and examine content to determine if file is pre-encrypted". This process block saves the URL and examines the content file metadata to determine if the selected content file has been pre-encrypted. If the content file has been pre-encrypted, control falls through to processing block 207 "content is pre-encrypted" indicating that the requested content is pre-encrypted.

This processing block determines that a key exchange needs to be performed because the selected content residing on local content server 20 is already encrypted. Processing block 207 then sends signal 208 "need session key" indicating that it needs a session key to notify processing block 210 "perform a key exchange".

Stream receiver 12 maintains a public/private key encryption (asymmetrical keys) application. Processing block 210 sends its public key and a request for a session key (symmetrical key) as signal 212 "public key" to processing block 214 "receive public key, retrieve session key for content file, and encrypt with stream receiver's public key".

This processing block retrieves the session key for the selected content file to be streamed. The session key for pre-encrypted content files will be unique for each content file. After the session key has been retrieved, it is encrypted with the public key received from stream receiver 12 processing block 210. The encrypted session key is sent as signal 216 to stream receiver 12, to notify processing block 218 "notify content server to start streaming encrypted content".

This processing block sends signal 220 "start stream" to processing block 222 "send pre-encrypted stream to stream receiver".

This processing block begins reading pre-encrypted data from the selected content file and sending it to processing block 226 "receive encrypted stream, decrypt and send to television". This processing block receives the encrypted content stream and decrypts it using the session key then sends the clear text stream to television 14.

Figure 4:
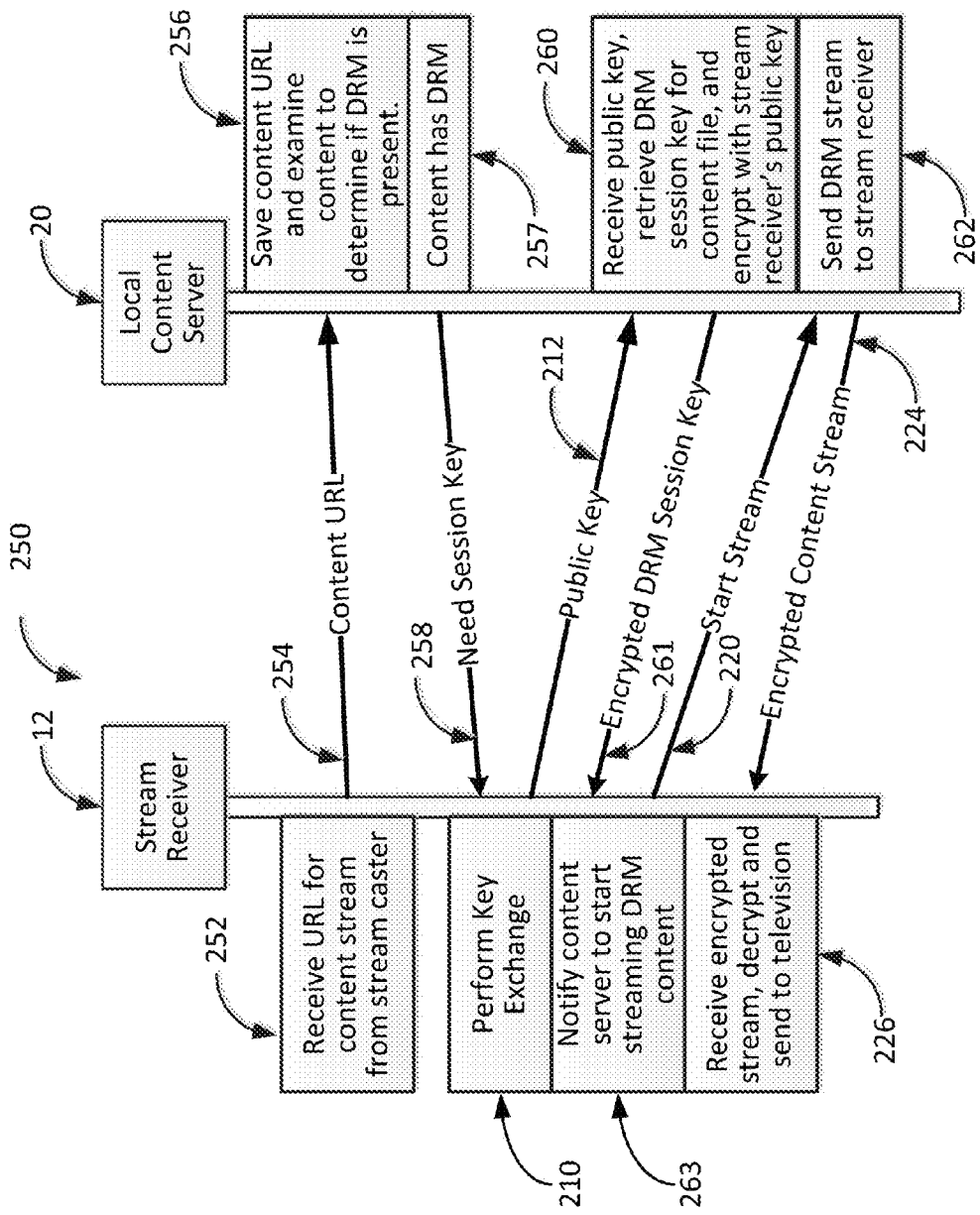
FIG. 4 is a schematic depicting the logic flow for the case where content residing on the content server is protected with DRM impressed on the content by the content owner prior to the content being placed on the content server.

Now referencing FIG. 4 where 250 depicts the case where the content selected by the user is protected with DRM by the content owner. This type of content protection is typically applied prior to the content owner sending the content to a content server. This depiction starts at processing block 252 "receive URL for content stream from stream caster" where the stream receiver receives a URL for content stream from stream caster.

This processing block sends signal 254 "Content URL" to processing block 256 "save content URL and examine content to determine if DRM is present". This processing block saves the URL and examines the content metadata to determine if the content is protected through DRM by the content owner. If the content has DRM applied to it, control falls through to processing block 257 "content has DRM" indicating that the content has DRM applied to the content.

This processing block sends signal 258 "needs session key", to processing block 210 "perform key exchange" which operates to perform a key exchange.

Stream receiver 12 maintains a public/private key encryption (asymmetrical keys) application. Processing block 210 sends its public key and a request for a session key (symmetrical key) as signal 212 "public key" to processing block 260 "receive the public key, retrieve DRM session key for content file, and encrypt with the stream receiver's public key".

This processing block retrieves the DRM session key for the selected content file to be streamed. The DRM session key for content files protected by DRM provided by the content owner. After the DRM session key has been retrieved, it is encrypted with the public key received from stream receiver 12. Encrypted session key is sent as signal 261 "encrypted DRM session key", to notify processing block 263 "notify content server to start streaming DRM content".

This processing block will then send signal 220 "start stream" to send processing block 260 "send DRM stream to stream receiver".

This processing block will begin reading DRM protected data from the selected content stream file and sending it to processing block 226 "receive encrypted stream, decrypt it, and send it to the television" as signal 224 "encrypted content stream".

This processing block receives signal 224 "encrypted content stream", decrypts it, then sends the in the clear to television 14.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art. For example, the techniques described herein can be used with other kinds of shapes and sounds, and with different kinds of external sensors.

Note also that the above has described operation with a digital television. However, more generally, this can be used on any kind of device that displays videos, such as television sets, Set top boxes, Game consoles, Tuner dongles, Personal computers, and any other device having the ability to display AV content. Also, while this describes only a few specific kinds of encryption keys and key exchanges, it should be understood that this can be used with other kinds of systems that perform a key exchange.

Other kinds of content receivers and content servers are also contemplated, it being understood that each of these can be carried out by a computer that has a processor that executes stored instructions of any known type.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be controlled by a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, displayport, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of playing content from a remote device, comprising:
    receiving a content list of content that can be played, said content being content that is on a remote device and displaying said list to a user;
    receiving a selection from the list by said user of selected content to be received from the remote device;
    displaying a dialog to a user, querying the user about whether the user desires the selected content to been encrypted prior to being streamed to the user;
    receiving an answer from the user about whether the user desires the selected content to be encrypted prior to being streamed to the user;
    if the user does not indicate that the content should be encrypted, then requesting streaming of clear content representing said selected content from said remote device; and
    if the user does indicate the content should be encrypted, then commanding carrying out of a key exchange between the user and the remote device responsive to the user indicating that the content should be encrypted, and receiving an encrypted version of said selected content, which is encrypted using keys from the key exchange.

2. The method as in claim 1, further comprising outputting said content to a television.

3. The method as in claim 1, further comprising commanding using keys generated during the key exchange to encrypt and send content, the encrypting being done responsive to the indication that the content should be encrypted.

4. The method as in claim 3, wherein said keys are symmetrical session keys.

5. The method as in claim 3, wherein said keys are keys from a public and private key encryption system.

6. The method as in claim 1, further comprising, prior to said receiving, discovering content on the remote device to create said content list, and wherein content on the remote device includes both content that is stored encrypted and content stored unencrypted, and further comprising determining if the selected content is stored encrypted and if the selected content is stored encrypted, then commanding carrying out of a key exchange and commanding the selected content to be sent encrypted, and querying the user about whether the users wants the content to be encrypted if the selected content is stored unencrypted.

7. The method as in claim 6, wherein said remote device is at least one of a desktop or laptop computer, tablet computer, a cellular phone, a PDA, or a gaming console.

8. A method of playing content from a remote device, comprising:
   receiving a content list of content that can be played into a computer based device, said content being content that is on a remote device;
   receiving, in the computer based device, a selection from a user of selected content to be received from the remote device;
   determining if the selected content is encrypted;
   if the content is encrypted, then commanding carrying out of a key exchange and commanding the content to be sent to the user encrypted;
   if the content is not encrypted then displaying a dialog to a user, querying the user about whether the user desires encryption of the selected content, and receiving an answer from the user about whether the user desires the encryption of the selected content and determining if the user does not want the content to be encrypted, then requesting streaming of clear content to the user, and if the user does want the content to be encrypted, then commanding carrying out of a key exchange between the user and the remote device responsive to the user indicating that the content should be encrypted, and receiving an encrypted version of said selected content, which is encrypted before being sent to the user using keys from the key exchange.

9. The method as in claim 8, wherein said encrypted content is content that is protected using digital rights management.

10. The method as in claim 8, wherein said remote device is at least one of a desktop or laptop computer, tablet computer, a cellular phone, a PDA, a gaming console.

11. An apparatus for playing content from a remote device, comprising:
   a computer based system, receiving a content list of content that can be played from a remote device that is wirelessly connected to said computer based system;
   said computer based system having a user interface, receiving a selection from a user of selected content to be received from the remote device, and displaying a dialog, querying a user about whether the user desires the selected content to be encrypted prior to being streamed to the user, and receiving an answer from the user about whether the user desires the selected content to be encrypted prior to streaming; and
   wherein said computer based system operates such that if the user does not want the content to be encrypted, then requesting streaming of the selected content as clear content, and if the user does want the content to be encrypted, then commanding carrying out a key exchange between the user and the remote device responsive to the user indicating that the content should be encrypted, and receiving an encrypted version of said selected content, which is encrypted using keys from the key exchange.

12. The apparatus as in claim 11, wherein the commanding comprises commanding the output to be sent to a television.

13. The apparatus as in claim 11, further comprising commanding using keys generated during the key exchange to encrypt and send content, the encrypting being done responsive to the indication that the content should be encrypted.

14. The apparatus as in claim 13, wherein said keys are symmetrical session keys.

15. The apparatus as in claim 13, wherein said keys are keys from a public and private key encryption system.

16. A apparatus as in claim 11, wherein the computer based system operates to discover content on at least one remote device to create said content list, and wherein content on the remote device includes both content that is stored encrypted and content stored unencrypted, and further comprising determining if the selected content is stored encrypted and if the selected content is stored encrypted, then commanding carrying out of a key exchange and commanding the selected content to be sent encrypted, and querying the user about whether the user wants the selected content to be encrypted if the selected content is stored unencrypted.

17. The apparatus as in claim 11, wherein said remote device is at least one of a desktop or laptop computer, tablet computer, a cellular phone, a PDA, a gaming console.

18. An apparatus for playing content from a remote device, comprising:
   a computer based system, receiving a content list of content that can be played from a remote device that is wirelessly connected to said computer based system;
   said computer based system having a user interface, receiving a selection from a user of selected content to be received from the remote device; and
   if the selected content is encrypted, then commanding carrying out a key exchange of encryption keys and commanding the content to be sent encrypted, and if the content is not encrypted then displaying a dialog to a user, querying the user about whether the user desires the selected content to be encrypted prior to streaming, and receiving an answer from the user about whether the user desires the selected content to be encrypted prior to streaming and determining if the user does not want the content to be encrypted, then requesting streaming of clear content, and if the user does want the content to be encrypted, then commanding carrying out of a key exchange between the user and the remote device responsive to the user indicating that the content should be encrypted, and receiving an encrypted version of said selected content, which is encrypted before being sent to the user using keys from the key exchange.

19. The apparatus as in claim 18, wherein said encrypted content is content that is protected using digital rights management.

20. The apparatus as in claim 18, wherein said remote device is at least one of a desktop or laptop computer, tablet computer, a cellular phone, a PDA, a gaming console.

* * * * *